United States Patent [19]

Spector

[11] Patent Number: 4,597,781
[45] Date of Patent: Jul. 1, 1986

[54] COMPACT AIR PURIFIER UNIT

[76] Inventor: Donald Spector, 380 Mountain Rd., Union City, N.J. 07087

[21] Appl. No.: 673,725

[22] Filed: Nov. 21, 1984

[51] Int. Cl.⁴ .............................................. B03C 3/01
[52] U.S. Cl. ....................................... 55/126; 55/279; 55/152; 55/485; 55/487; 55/503; 55/505; 55/467
[58] Field of Search ................... 55/124, 126, 151, 152, 55/485, 279, 467, 473, 487, 503, 504, 505

[56] References Cited

U.S. PATENT DOCUMENTS

| 24,551 | 6/1859 | Fontain | 55/503 |
|---|---|---|---|
| 3,157,479 | 11/1964 | Boles | 55/152 |
| 3,988,131 | 10/1976 | Kanzawa | 55/124 |
| 4,137,647 | 2/1979 | Clark | 55/485 |
| 4,261,712 | 4/1981 | Kinkade | 55/126 |

FOREIGN PATENT DOCUMENTS

| 2400688 | 7/1975 | Fed. Rep. of Germany | 55/485 |
|---|---|---|---|
| 2506520 | 8/1976 | Fed. Rep. of Germany | 55/279 |
| 650908 | 10/1928 | France | 55/485 |
| 252054 | 11/1926 | United Kingdom | 55/485 |

Primary Examiner—Bernard Nozick
Attorney, Agent, or Firm—Michael Ebert

[57] ABSTRACT

A compact unit adapted to remove particulate contaminants from the atmosphere of a room and at the same time to render the atmosphere more pleasing. The unit is provided with a casing that includes a cylindrical flow tube through which the air to be purified is drawn by means of a suction fan at the outlet end of the tube. Attachable to the inlet end of the tube is a series of inter-coupled filter rings which are progressively graded to remove more or less coarse particles. The last filter ring in the series is constituted by a porous disc impregnated with a volatile aromatic liquid which is volatilized by the forced air stream to impart a fragrance thereto. Intermediate the inlet and outlet of the tube is an electrostatic precipitator constituted by a negatively-charged ionizer electrode and a positively-charged tubular collector which act to extract residual fine particles from the air stream, whereby the air returned to the atmosphere from the outlet is substantially free of contaminants and is fragrant.

9 Claims, 4 Drawing Figures

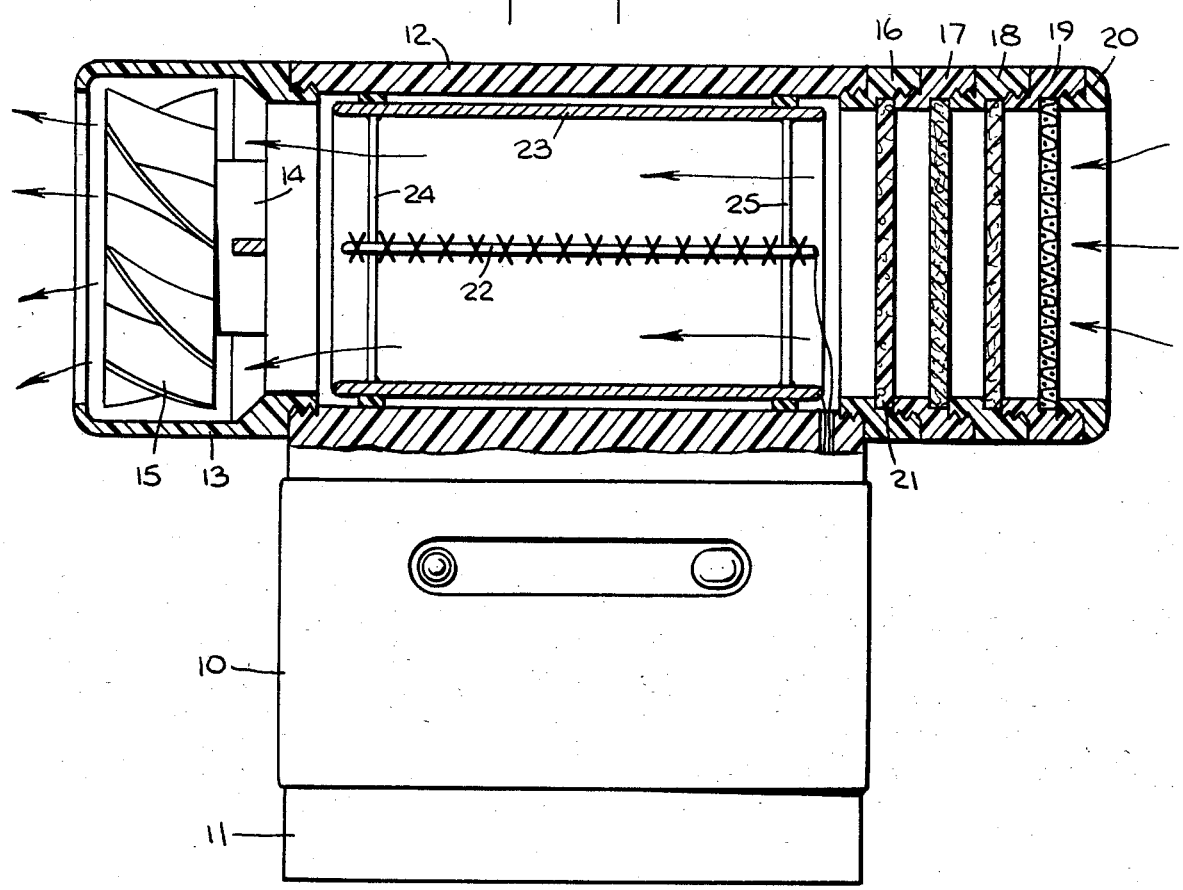
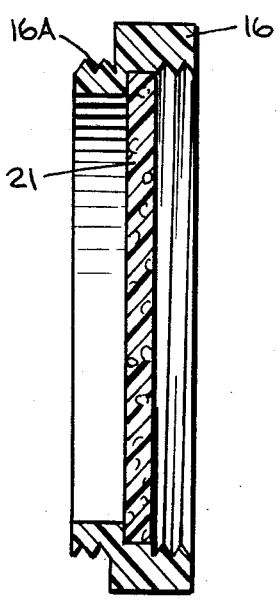

COMPACT AIR PURIFIER UNIT

BACKGROUND OF INVENTION

1. Field of Invention

This invention relates generally to air purifiers for use in the home or in the office for removing particulate contaminants from the atmosphere; and more particularly to a unit of this type which combines mechanical and electrostatic filtration to ensure the removal of both fine and coarse particles and which at the same time imparts a pleasing aroma to the atmosphere.

2. Status of Art

The typical modern urban and suburban environment is almost never pure and salubrious. The degree of pollution which permeates the atmosphere depends on whether the city is a site for so-called smoke-stack industries which spew contaminants into the atmosphere, and also on whether local electric power plants are coal-burning. Other factors are the presence of incinerators and the density of vehicular traffic. Automotive and truck exhausts are a major source of pollutants in many communities.

Where the city is notoriously windy as is in the case for Chicago, or is somewhat less so as in New York, many contaminants are blown away by the prevailing winds, or at least transferred to other communities. In the case of a city such as Los Angeles which is not heavily industrialized, the pollution level may nevertheless be high because of static air conditions.

In some American cities, environmental tests are conducted on a day to day basis, and when the measured pollution level is so high as to represent a danger to those suffering from pulmonary disorders or allergies which are adversely affected by pollutants, local residents are then warned to stay indoors until a clear signal is sounded. This practice is based on the supposition that the indoor environment is somewhat less polluted. But recent studies conducted by environmental agencies indicate that in many homes the indoor atmosphere is no less polluted than that outside.

The reason for this surprising conclusion lies in the efficiency of modern home insulation and the absence of drafts. A well insulated home is almost hermetically isolated from the exterior atmosphere and therefore undergoes a gradual build up of contaminants which are internally generated. These contaminants have many sources, such as air-borne fibers derived from rugs and other fabrics, hairs from pet animals and particulate matter thrown off by household ovens and furnaces. As a consequence, little may be gained when one is secluded in a home to avoid outdoor pollution, for the interior atmosphere may not be free of contaminants.

Various domestic filtration units are commercially available for home use. Thus the typical household air conditioner includes a fibrous or open cell foam plastic filter to remove coarse particles from air passing through the conditioner. Some electric ovens now on the market include a high voltage electrostatic precipitator unit to purify the air in the region of the oven.

U.S. Pat. No. 3,315,445 to deSeversky points out that mechanical filtration systems such as centrifugal and cyclonic collectors which function to remove contaminants from an air stream are only effective for particles of over 25 microns in size. Much finer particles cannot be extracted by conventional mechanical means. The most effective way of removing very fine particles is by electrostatic precipitation in which the particles in the stream are negatively ionized and conveyed through a positively-charged tubular collector.

In the resultant electrostatic field, the negatively charged particles are caused to migrate toward the collector so that the air stream emerging from the collector is substantially free of particles. In the system disclosed in the deSeversky patent, the air stream is first forced through a scrubber and then passes through an electrostatic precipitator. This system is suitable for industrial installations but is inappropriate for home use.

In purifying the air in the home it is essential that very fine as well as relatively coarse particles be removed. Fine particles tend to pass through the natural filters existing in nasal passages and penetrate the pulmonary system to a greater degree than coarse particles. Thus a familiar objection to the typical fibrous filter placed at the mouth end of a cigarette is that it acts only to remove coarse particles from the smoke and offers little protection against finer particles which are inhaled into the lungs by the smoker.

In the home or office, it is not only essential to remove contaminants from the air to render the atmosphere free of irritants, but it may also be desirable to impart a pleasing fragrance thereto to mask unpleasant odors. The use of aroma generators or air fresheners for this purpose is commonplace, but such devices have heretofore been in the form of separate units.

SUMMARY OF INVENTION

In view of the foregoing, the main object of the invention is to provide a highly compact unit suitable for the home or office which not only removes the full spectrum of particulate contaminant from the atmosphere of the room in which the unit is installed, but also functions to impart a pleasing fragrance to the purified atmosphere.

More particularly, an object of this invention is to provide a unit of the above type with a set of replaceable filter rings having different filtration grades whereby the user may set up a series of filters which are appropriate to the prevailing atmospheric conditions.

Also an object of this invention is to provide a unit of the above type which operates reliably and efficiently, and which may be mass-produced at relatively low cost.

Briefly stated, these objects are accomplished in a compact unit adapted to remove particulate contaminants from the atmosphere of a room and at the same time to render the atmosphere more pleasing. The unit is provided with a casing that includes a cylindrical flow tube through which the air to be purified is drawn by means of a suction fan at the outlet end of the tube. Attachable to the inlet end of the tube is a series of intercoupled filter rings which are progressively graded to remove more or less coarse particles. The last filter ring in the series is constituted by a porous disc impregnated with a volatile aromatic liquid which is volatilized by the forced air stream to impart a fragrance thereto. Intermediate the inlet and outlet of the tube is an electrostatic precipitator constituted by a negatively-charged ionizer electrode and a positively-charged tubular collector which act to extract residual fine particles from the air stream, whereby the air returned to the atmosphere from the outlet is substantially free of contaminants and is fragrant.

OUTLINE OF DRAWINGS

For a better understanding of the invention as well as other objects and further features thereof, reference is made to the following detailed description to be read in conjunction with the accompanying drawings, wherein:

FIG. 2 is a longitudinal section taken through the unit;

FIG. 3 is a section taken through one of the replaceable filter rings; and

DESCRIPTION OF INVENTION

Figure 1:
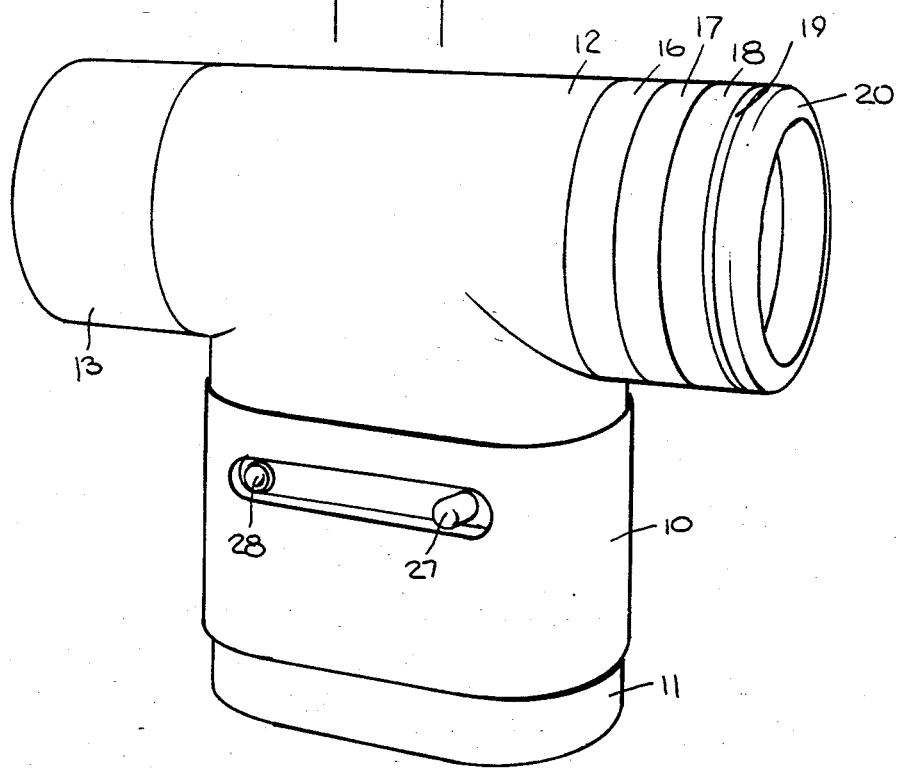
FIG. 1 is a perspective view of an air purifier unit in accordance with the invention.

Referring now to FIG. 1 there is shown a compact air purifier unit in accordance with the invention, the unit including a casing 10 having an oblong crossection mounted on a similarly-shaped base 11 and a horizontally-extending flow tube 12 supported above the casing and integral therewith. The entire structure may be molded in one piece of synthetic plastic material such as PVC.

Threadably received on the outlet or front end of flow tube 12 is a removable collar 13 within which is coaxially supported a miniature A-C motor 14. This motor drives a turbine fan 15 in a direction drawing air through the flow tube from the inlet to the outlet end thereof whereby air from the atmosphere of the room in which the unit is installed is drawn into the tube where it is purified before being fed back to the atmosphere. In this way, the air in the room is continuously recirculated through the unit, so that depending on the size of the room and the flow rate of the unit, all the air therein may be treated in one or more hours.

Attached to the inlet end of tube 12 is a series of intercoupled replaceable filter rings 16, 17, 18, and 19 and a locking ring 20. As shown in ring 16 in FIG. 3, each ring is internally threaded and is provided with an externally-threaded front projection 16A. In this way ring 16, the first in the series, may be threadably coupled to the internally-threaded rear end air inlet of the flow tube, and the remaining rings in the series may be threadably coupled to each other. Within each ring is a filter element 21 whose grade is different for each ring, as will later be explained.

The serial ring arrangement permits the user to choose and set up a series of filter rings which are appropriate to prevailing atmospheric conditions. While four filter rings are shown, a greater or smaller number may be used in practice to meet particular requirements.

Disposed within flow tube 12 is a dry electrostatic precipitator in the form of a center electrode 22 which is preferably barbed to promote ionization, and a tubular collector 23 surrounding the electrode, electrode 22 being coaxially supported within the collector by electrically insulating spiders 24 and 25.

Figure 4:
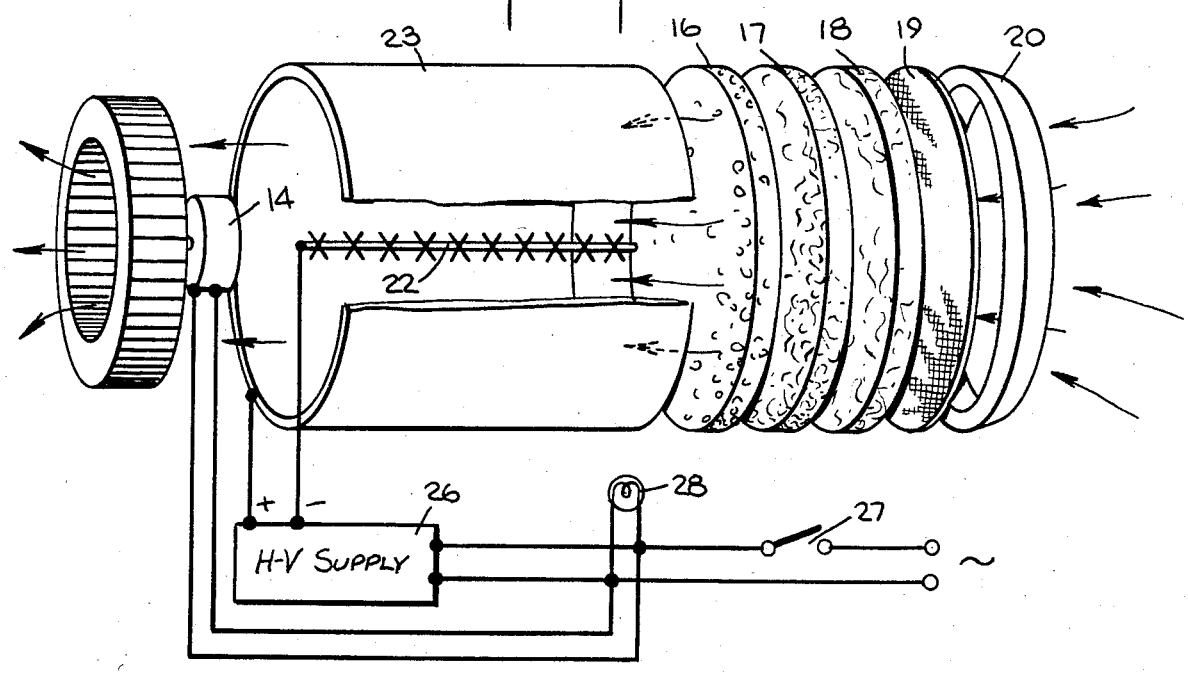
FIG. 4 is a schematic diagram of the unit to illustrate the functioning of its components.

Electrode 22 is connected, as shown in FIG. 4, to the negative terminal of a high voltage D-C supply 26 disposed within casing 10, the collector 23 being connected to the positive terminal thereof. High voltage supply 26 may take the form of a diode and capacitor matrix which is coupled to a standard A-C power line and is adapted to rectify and multiply the voltage to produce a high voltage D-C creating an electrostatic field between the electrode and the collector.

The high voltage supply 26 and fan motor 14 are both connected through a switch 27 to the power line. A pilot light 28 is shunted across the output of the switch to indicate that power is "on" when the switch is closed. Switch 27 and pilot light 28 are mounted on casing 10.

The choice of filters is determined by the particulate matter to be removed. Thus the filter in ring 19 which is the last in the filter series and the first to receive the incoming air stream may be a relatively gross metal or fiber mesh adapted to remove very coarse particles such as cinders. The filter in ring 18, the next in line, may be of a somewhat finer grade to remove air borne fabric fibers as well as dog or cat hairs, while that in ring 17 may be still finer to remove air borne pollen and dust.

The filter in ring 16, the first in the series and the last to receive the incoming air before the air then passes through the electrostatic precipitator, takes the form of a porous pad having good wicking properties. This may be formed of open-cell foam plastic material or a nonwoven fabric which is impregnated with a volatile liquid fragrance. Hence this filter has a dual function in that it serves to trap somewhat fine particles in the air passing therethrough and at the same time, it yields an aromatic vapor as a result of evaporation promoted by the forced air stream. The aromatic liquid may be a perfume in an alcohol base, but it is not limited to pleasing fragrances and it may be a volatile air freshener or deodorizer.

When the aromatic liquid is exhausted, it is a simple matter to remove filter 16 in order to clean and recharge it with liquid, whereby because of its wicking properties, the liquid is spread uniformly through the porous pad. And the other filters may also be removed from time to time for cleaning.

The air emerging from the series of filters will still carry microscopically fine contaminants, and the function of the electrostatic precipitation is to remove these contaminants before the air is discharged from the outlet of the unit.

Electrode 22, because it is barbed, produces corona effects and the resultant negative ions become attached to the fine particles. An electrostatic field is created between electrode 22 and collector 23, as a consequence of which the ionized particles are caused to migrate toward the inner surface of the collector and to settle therein. The collector may be cleaned from time to time by removing collar 13 to gain access to the interior of the flow tube.

Ionizing electrode 22 acts to ionize the molecules of air passing through the collector, so that the purified air discharged into the atmosphere is still negatively charged. A negatively-ionized atmosphere has a germicidal effect and is also believed to be beneficial in other respects to the occupants of the room.

Thus a unit in accordance with the invention has multiple functions, for it not only removes the full spectrum of particulate contaminants from the air stream, but it also ionizes the air and renders it more fragrant or pleasing.

While there has been shown and described a preferred embodiment of COMPACT AIR PURIFIER UNIT in accordance with the invention, it will be appreciated that many changes and modifications may be made therein without, however, departing from the essential spirit thereof. Thus while the rings have been shown as having externally-threaded projections to make intercoupling possible, in practice other coupling means may be used such as bayonet type or snap-in couplings. And instead of a porous pad for the aromatic filter, this may be formed by a mesh holding aromatic beads through which the air flows.

I claim:

1. A compact air purifier unit adapted to remove contaminating particles of varying sizes which fall within different classes in a range from fine to coarse from the atmosphere of a room, said unit comprising:

A a flow tube having an inlet and an outlet;

B a suction fan coupled to the outlet of the tube to draw air therethrough; and

C a series of removable filter rings all having the same diameter, each provided with an air-permeable filter element supported within a ring, said filter rings being coupled to each other and to the inlet of the tube, each filter ring having a different grade of filter element therein, each grade being adapted to remove particles in a given class in said range whereby the series acts to remove the fine and coarse particles from the air stream passing therethrough, said rings being provided with intercoupling means whereby the series thereof may be coupled to each other, with the last in the series being coupled to the inlet of the tube.

2. A unit as set forth in claim 1, in which the suction fan is constituted by a miniature motor coaxially mounted within a collar attachable to the outlet, the motor driving turbine blades.

3. A unit as set forth in claim 1, wherein one of said filter elements is a porous pad impregnated with a volatile aromatic liquid which when the air stream is forced therethrough yields an aromatic vapor fragrance.

4. A unit as set forth in claim 1 wherein one of said filter elements is a mesh in a grade adapted to remove coarse cinders from the air stream.

5. A unit as set forth in claim 1 wherein one of said filter elements is in a grade adapted to remove hairs from the air stream.

6. A unit as set forth in claim 1 wherein each ring is internally threaded and includes an externally threaded front projection whereby the rings may be readily intercoupled.

7. A unit as set forth in claim 1, further including an electrostatic precipitator disposed in said tube between the inlet and outlet thereof, said precipitator being formed by a tubular collector which is positively charged and a negatively-charged electrode coaxially disposed within said collector.

8. A unit as set forth in claim 7, wherein said tube is mounted above a casing and extends in the horizontal direction.

9. A unit as set forth in claim 8, further including a high voltage direct current supply disposed in said casing and connected between said collector and said electrode.

* * * * *